(12) United States Patent
Karrer Walker et al.

(10) Patent No.: US 10,109,109 B2
(45) Date of Patent: Oct. 23, 2018

(54) METHOD FOR INSPECTING A SECURITY DOCUMENT

(71) Applicant: OVD Kinegram AG, Zug (CH)

(72) Inventors: Reto Karrer Walker, Unterageri (CH); Andreas Schilling, Hagendorn (CH)

(73) Assignee: OVD KINEGRAM AG, Zug (CH)

(*) Notice: Subject to any disclaimer, the term of this patent is extended or adjusted under 35 U.S.C. 154(b) by 92 days.

(21) Appl. No.: 14/739,568

(22) Filed: Jun. 15, 2015

(65) Prior Publication Data
US 2015/0371445 A1 Dec. 24, 2015

(30) Foreign Application Priority Data

Jun. 18, 2014 (DE) .......................... 10 2014 108 578

(51) Int. Cl.
*G06T 19/00* (2011.01)
*G06T 7/73* (2017.01)
(Continued)

(52) U.S. Cl.
CPC ............ *G06T 19/006* (2013.01); *G02B 17/00* (2013.01); *G06F 1/16* (2013.01); *G06F 3/00* (2013.01);
(Continued)

(58) Field of Classification Search
CPC .................................................. G06T 19/006
See application file for complete search history.

(56) References Cited

U.S. PATENT DOCUMENTS

| 5,760,386 A * | 6/1998 | Ward ..................... G06K 13/18 |
| | | 235/488 |
| 6,220,515 B1 * | 4/2001 | Bello ................... G06Q 20/341 |
| | | 235/454 |

(Continued)

FOREIGN PATENT DOCUMENTS

| AU | 201300154 A4 * | 4/2013 |
| KR | 201104587 A * | 5/2011 |

(Continued)

OTHER PUBLICATIONS

NASA, What Wavelength Goes With a Color?, downloaded Dec. 18, 2016 from https://science-edu.larc.nasa.gov/EDDOCS/Wavelengths_for_Colors.html, 2 pages.*

(Continued)

*Primary Examiner* — Jeffery A Brier
(74) *Attorney, Agent, or Firm* — Hoffmann & Baron, LLP

(57) ABSTRACT

The invention relates to a method for inspecting a security document (10), the use of an augmented reality system (20) for inspecting a security document (10) as well as an augmented reality system (20). One or more first items of information of the security document (10) are captured by means of an augmented reality system (20), in particular a pair of smartglasses. The one or more first items of information are then checked by comparison with a database (40). Furthermore, one or more of the results of the check of the one or more first items of information are stored and/or one or more of the results of the check of the one or more first items of information are output by means of the augmented reality system (20).

35 Claims, 7 Drawing Sheets

(51) Int. Cl.
*G06F 17/30* (2006.01)
*G06K 9/00* (2006.01)
*H04N 5/53* (2006.01)
*H04N 5/232* (2006.01)
*G07C 9/00* (2006.01)
*G02B 17/00* (2006.01)
*G06F 1/16* (2006.01)
*G06F 3/00* (2006.01)
*H04N 5/33* (2006.01)

(52) U.S. Cl.
CPC .. *G06F 17/30011* (2013.01); *G06F 17/30424* (2013.01); *G06K 9/00442* (2013.01); *G06T 7/73* (2017.01); *G07C 9/00079* (2013.01); *H04N 5/23222* (2013.01); *H04N 5/33* (2013.01)

(56) References Cited

U.S. PATENT DOCUMENTS

| | | | | |
|---|---|---|---|---|
| 2003/0218328 | A1* | 11/2003 | Conwell | B42D 25/29 281/31 |
| 2007/0252001 | A1* | 11/2007 | Kail | G07C 9/00087 235/380 |
| 2008/0181450 | A1* | 7/2008 | Carr | G06K 9/2063 382/100 |
| 2010/0195174 | A1* | 8/2010 | Nemeth | B42D 25/435 359/2 |
| 2012/0075168 | A1 | 3/2012 | Osterhout et al. | |
| 2012/0075442 | A1 | 3/2012 | Vujic | |
| 2013/0069985 | A1 | 3/2013 | Wong et al. | |
| 2014/0125558 | A1 | 5/2014 | Miyajima et al. | |

FOREIGN PATENT DOCUMENTS

| | | |
|---|---|---|
| WO | WO2008110787 | 9/2008 |
| WO | WO2013128019 | 9/2013 |

OTHER PUBLICATIONS

Karl Koscher et al., EPC RFID Tag Security Weaknesses and Defenses: Passport Cards, Enhanced Drivers Licenses, and Beyond, Nov. 2009, ACM, In Proceedings of the 16th ACM conference on Computer and communications security, pp. 33-42.*

G. Matthew Ezovski and Steve E. Watkins, The Electronic Passport and the Future of Government-Issued RFID-Based Identification, Mar. 2007, IEEE, 2007 IEEE International Conference on RFID, pp. 15-22.*

* cited by examiner

METHOD FOR INSPECTING A SECURITY DOCUMENT

This application claims priority based on German Application No. DE102014108578.7, filed on Jun. 18, 2014.

BACKGROUND OF THE INVENTION

The invention relates to a method for inspecting a security document, the use of an augmented reality system for inspecting a security document, as well as an augmented reality system.

Security documents are widespread in many fields of the public, governmental and private sectors. Thus, for example, identity cards and passports contain a plurality of different items of information, such as the pass holder's data, security elements for increasing the level of protection against forgery or biometric data stored on a chip, which, during inspections, have to be checked by the inspector. Thus, during an inspection process, in addition to personal data, for example the security elements of the security document are also to be inspected in order to detect a forgery or manipulation of the security document.

Because of the large number of items of information that security documents have and because of the relatively high time pressure during document inspection (typically approx. 15-20 seconds per document), it is not always possible to check the entire document reliably. Even if a plurality of security documents have to be inspected, for example within the framework of border controls or at airports, a comprehensive inspection of the security document by an inspector is not expedient as, because of the plurality of items of information of the security document, it is not possible to check all items of information sufficiently. Also, because of the plurality of different security documents, such as for example passports from different countries, it is often difficult to obtain precise knowledge about all items of information of such a security document in each case.

Furthermore, systems for automatic authentication of security elements are known, but these systems are limited primarily to the authentication of security elements of a document and disregard further items of information. They are also stationary units which are particularly well-suited to checking large quantities of identical objects, such as for example banknotes.

SUMMARY OF THE INVENTION

The object of the invention now is to improve the inspection of a security document.

In the following the abbreviation AR system is to stand and be used for augmented reality system.

In such a method for inspecting a security document, in particular an identification document, a visa, a birth certificate, a banknote, a security or a credit card, the following steps are carried out:
  capturing one or more first items of information of the security document by means of an AR system, in particular a pair of smartglasses, a tablet, a smartphone or a PDA;
  checking the one or more first items of information by comparison with a database;
  storing one or more results of the check of the one or more first items of information and/or outputting one or more results of the check of the one or more first items of information by means of the AR system.

To carry out such a method, an AR system, in particular a pair of smartglasses, a tablet, a smartphone or a PDA, is used for inspecting a security document, in particular an identification document, a visa, a birth certificate, a banknote, a security or a credit card, which AR system has the following components:
  one or more capture devices for capturing one or more first items of information of the security document;
  a control device, wherein the control device is designed such that it checks the one or more first items of information by comparison with a database and stores and/or outputs one or more of the results of the check of the one or more first items of information.

This makes a complete capture of the security document as well as a complete check of a plurality of items of information of the security document possible within a short time. Thus, the personal data, such as for example the photograph and the name and the address of the document holder, can be checked directly by comparison with a database. If discrepancies or hints appear during this check, these can be output as a result of the check. Thus, for example, it can be inspected directly whether an inspected individual is a wanted individual. Thus, the results can be output according to the relevance for the corresponding inspection process, with the result that for example in identity checks it is firstly output that this is a wanted individual. An efficient and rapid check of a plurality of different security documents is also possible. Thus, in comparison with an inspection by an inspector, the scope of the inspection is, for one thing, more comprehensive because a plurality of captured items of information are checked and, for another thing, more rapid and more secure because the captured items of information are checked directly by a comparison with a database. This makes a more user-friendly and more intuitive inspection possible compared with the above-named authentication systems.

By capture is meant here the detection of the one or more items of information by means of suitable sensors. For example, the one or more items of information can be present in analog or digital form after the capture by means of the suitable sensors. The one or more items of information are preferably converted into digital signals for example by means of A/D converters (A/D=analog/digital) in order then to be compared with the database.

For example, the capture of the one or more items of information can take place as soon as for example a corresponding sensor, such as for example a camera, has captured or detected the security document. It is likewise possible for the user to initiate the capture of the one or more items of information by manually actuating a device, preferably a touch-sensitive device, such as for example a touchscreen. It is likewise possible for the AR system for example to be voice-activated and for the capture of the one or more items of information to be initiated by voice commands. It is likewise possible for example for barcodes with recorded programs/processes to be available to the user in a display area. A capture in which for example orientation frames are overlaid and the corresponding item of information is captured by manual initiation is also possible.

By items of information is meant here various features, in particular of the security document, which have an information content. However, it is also possible for the items of information or features to be, for example, items of information about the document holder. Thus, for example, a photograph can be taken of the document holder and the physiological features of the document holder can be determined. Likewise, for example, features of the surroundings during the inspection process can be captured as further items of information. Thus, for example, the license plate number of a vehicle can also be captured as an item of information or feature. In addition to the already mentioned items of information, of course, further items of information can be captured.

By comparison is meant here checking items of information, for example the one or more first items of information, and allocated items of information from the database for sameness, match and/or the degree of match, or for the presence of the one or more items of information. Thus, for example, a captured image can subsequently be inspected for whether it matches an image recorded in the database or whether there are differences. If the captured items of information are not present in the database, these items of information can be stored in the database and used for further checks. Thus, for example, if the comparison with the database reveals that the captured items of information are not present in the database, then the captured items of information can be stored in the database in order, for example, to be used for further comparisons.

By AR system is to be meant any device which augments the perception of a user by means of technical aids. In addition to the already mentioned pair of smartglasses, tablet, smartphone or PDA, other devices can, of course, also be used. For example, it is also possible, instead of the named multipurpose devices, to use devices which are designed specifically only for carrying out this method. For example, an existing pair of smartglasses can be adapted to carrying out the method according to the invention by adapting the software and/or hardware.

The control device of the AR system preferably has a device for communicating with the database. Thus, for example, the AR system can have an interface for wireless or wired communication with the database.

Further advantageous embodiments of the invention are described in the dependent claims.

According to a preferred embodiment example of the invention, before and/or during the capture of one or more first items of information of the security document, instructions for what relative position and/or what distance relative to the AR system the security document is to be held in and/or moved into during the capture of the one or more first items of information are displayed by means of the AR system, in particular a pair of smartglasses. It can thus be ensured that even inexperienced users can reliably capture the one or more first items of information of the security document by means of the AR system. Should it not be possible to capture the one or more first items of information suitably by means of the AR system, then additional items of information can also be displayed to the user, which draw the user's attention to an error for example and instruct him on how this is to be avoided. Further additional specific hints can also be displayed to the user, using which features he can recognize forgeries.

The distance between the security document and the AR system is preferably determined by means of the AR system, in particular by time-of-flight measurements. Thus, for example, the distance between the security document and the AR system can be determined by means of optical, for example by using a laser, or acoustic, for example by using ultrasound, time-of-flight measurements. In addition to the already mentioned optical and acoustic time-of-flight measurement for determining the distance between the security document and the AR system, further measuring methods, such as for example time-of-flight measurements by means of electromagnetic waves in the radio wavelength range or interferometric measuring methods, can of course be used.

According to a further preferred embodiment example of the invention, the one or more first items of information of the security document comprise items of information regarding security features, photographs, coded identifiers and personal data, in particular name, address and date of birth.

The one or more first items of information preferably comprise items of information regarding the optical appearance of optically variable security features of the security document which are generated in an optically capturable manner by relief structures, in particular diffractive structures, zero-order diffraction structures, blazed gratings, linear or crossed sine-wave grating grating structures, binary grating structures or multilevel grating structures, freeform lens structures, macrostructures, in particular lens structures or microprism structures, mirror surfaces, mat structures, in particular anisotropic or isotropic mat structures or combinations of these structures. Furthermore, optically variable security features can also comprise, individually or in combination with the above-named relief structures, volume holograms, liquid-crystal layers, elements based on triple-layer Fabry-Pérot structures for generating color-shift effects dependent on the angle of view, or also contain security pigments or dyes. These security pigments or dyes can either generate different optical effects, in particular optically variable effects, under visible light and/or UV light and/or IR light or only be visible to the human eye when irradiated with light from a particular wavelength range. Examples are UV-active or IR-active pigments or OVI® pigments. These security pigments or dyes can be applied partially or over the whole surface using known printing methods such as offset printing, gravure printing, intaglio printing or screen printing. For example, fine-line security patterns such as for example complex guilloche patterns or other motifs can also be formed thereby. Optical security features can likewise be formed by watermarks or by metallic or non-metallic reflective layers. These reflective layers, individually or in combination with other security features, can be printed on or vapor-deposited and can be formed over the whole surface or partially, in particular with finely engraved moldings and motifs with a particularly high level of protection against forgery. Such shaped security documents have a particularly high level of protection against forgery.

Further, it is also possible for one or more symbols, logos, images, signs, alphanumeric characters or numbers to be captured as one or more of the first items of information.

According to a further preferred embodiment example of the invention, during the capture of the one or more first items of information, one or more of the first items of information are machine-read from the security document optically, electromagnetically, magnetically, electrically and/or electronically. It is hereby achieved that the security document is automatically captured as completely as possible. In addition to the items of optical information, security documents often comprise further features which are introduced for example into electrically conductive areas of the security document. Security documents also often have, for example, machine-readable zones which are designed such that they can be read by means of optical character recognition.

Further, it is advantageous if the reading step comprises reading from one or more, in particular electronic, storage media of the security document, for example a memory chip. Additional items of information of the security document that are not optically capturable can hereby be captured. Thus, it is possible, for example, to compare a photograph which is stored on one or more storage media of the security document with a photograph on the security document and thus to further improve the inspection of the security document. Furthermore, further items of information which are helpful for checking the security document can be made available here, such as for example checking rules for high-security security elements of the security document.

The one or more storage media preferably contain biometric data. A particularly efficient comparison for example with a biometric photograph on the security document can hereby be made possible, as biometric data, such as for example biometric passport photographs, often meet particular requirements which contribute to facilitating facial recognition using the photograph. By items of biometric information is meant items of information which serve to identify individuals. In addition to the already mentioned item of biometric information for facial recognition, items of biometric information likewise relate, for example, to the body measurements or the fingerprints or the iris of the human eye or the vein patterns in the hand.

Further, it is also possible for the one or more storage media to be read by means of electromagnetic waves, in particular an RFID reader. This makes a rapid and contactless reading of the one or more storage media possible.

Further, it is advantageous for the reading step to comprise the reading of one or more first items of optical information which are not visually recognizable for the human observer and which, in particular, are machine-readable using one or more image-capture systems, preferably IR cameras. By not visually recognizable is to be meant that the one or more first items of information cannot be resolved by the human eye at a usual observation distance of approximately 30 cm, preferably of from 10 to 50 cm, and with a usual illuminance of 1000 lx, preferably of from 10 lx to 10,000 lx or that the one or more first items of information lie in a spectral range which lies outside the range visible to the human eye. It is hereby achieved that one or more first items of information are captured which cannot be perceived by a purely visual inspection. The check, in particular in a short period of time, is thus improved for example.

Further, it is advantageous if at least one of the capture devices of the AR system detects electromagnetic waves in the wavelength range of from 200 nm to 50 µm, preferably 380 nm to 3 µm. Through such a design it is achieved that spectral ranges outside the range visible to the human eye, in particular in the UV and IR range, and in the spectral range visible to the human eye are captured. The capture of the above-named spectral ranges makes it possible, for example, to check the security document by means of a spectral analysis. For this, for example, a wavelength range of from 380 nm to 3 µm is detected by means of a capture device. A spectral analysis is carried out on the basis of the captured wavelength range. This is carried out, for example, by means of a fast Fourier transform. The corresponding spectral components can furthermore be ascertained by a thresholding method and compared with spectral components of the security document to be inspected stored in the database. Furthermore, for example, the brightness distribution, an analysis of the color space, color temperature or printed image of the personalization (e.g. pixelation) of the one or more of the captured first items of optical information can be used to check the security document.

During the above-named check of a security document, in particular a passport, to identify individuals, the one or more first items of information of the security document, in addition to the items of information already named above such as for example the photograph, the name of the document holder or the security elements of the security document, can also be further entries in the passport such as for example visas or other inspection stamps. Thus, e.g. in the case of a passport, not only is the actual security document checked, but also any supplements or entries that may appear inside the passport.

Furthermore, it is possible for the security document to be a baggage tag or an air ticket. The one or more first items of information can be, for example, a barcode, the ownership of the item of baggage, the place of posting or the allocation to the document holder. During the check, as described further below, one or more items of additional information can be allocated to these one or more first items of information.

According to a preferred embodiment example of the invention, one or more second items of information about the document holder, in particular the identity card holder, are captured by means of the AR system. The capture of one or more second items of information about the document holder makes it possible to further improve the check of the security document because, in addition to the one or more first items of information of the security document, the one or more second items of information about the document holder can be compared for matches or deviations. Thus, for example, it can be checked whether the document holder is identical to the individual to whom the security document was issued. Deviations in the anatomical-physiological features of the document holder can also be overlaid, which makes the handling and the inspection process easier and correspondingly speeds them up.

The one or more second items of information about the document holder are preferably items of biometric information, in particular of the head, and are determined by an image-processing algorithm, in particular a facial recognition algorithm.

Further, it is also possible for the one or more second items of information to comprise one or more parameters which specify a pathognomy, physiognomy and/or physiology of the document holder. Pathognomy here relates to the state of mind, physiognomy relates to the facial features and physiology relates to the emotions of the document holder, which can be determined, for example, by adapting the software and/or hardware of the AR system. In addition to the already mentioned fields of pathognomy, physiognomy and/or physiology, further criteria can, of course, be used. Such items of information make it possible to determine the mood of the document holder and to output distinctive features or hints to the user. This type of items of information (pathognomy, physiognomy, physiology) can hereby be carried out many times more effectively, more productively and more objectively. If, on the other hand, these items of information are determined, for example, by border guards in order to obtain hints to suspicious individuals, a successful determination of these items of information strongly depends on the personal aptitude/experience/intuition of the border guard.

During the check of the one or more first items of information, the one or more first items of information or one or more items of information from the database are preferably compared with the one or more second items of information. This comparison preferably takes place in the database. However, it is also possible for the comparison to be carried out, for example, by means of the AR system, with the result that there is no need to transmit the one or more second items of information to the database by means of a suitable device.

According to a further preferred embodiment example of the invention, one or more of the captured first items of information are output by means of the AR system, in particular in visual, acoustic and/or tactile form, in particular before the check is carried out. This makes it possible to present the one or more first items of information in respect of a prioritization, for example depending on the check carried out. Thus, for example, the one or more first items of information can be output according to their relevance. This makes a user-friendly and rapid performance of the inspection process possible.

The AR system preferably superimposes one or more of the results of the check on the security document optically by means of an optical overlay. Such a design makes it possible to present the results of the check directly to a user optically and to visualize discrepancies or conflicts on the security document. Thus, for example, deviating security features of the security document or deviations in respect of the personal data can be overlaid. A user-friendly handling is hereby achieved. The user also hereby achieves, for example, a better control of the inspection, as results of the check can be assessed according to their relevance.

Further, it is also possible for one or more of the results of the check which are superimposed on the security document by means of the optical overlay to comprise items of information regarding discrepancies/conflicts on the security document, security features containing discrepancies, items of content information or anatomical-physiological features. In other words, the optical overlays which present the results of the check contain details regarding discrepancies/conflicts on the security document, security features containing discrepancies, items of content information or anatomical-physiological features.

Further, it is possible, after the step of checking the one or more of the captured items of information, for the result of the check to be output only when the result of the check is a useful hint for the user, for example a suspicion of a forgery. Thus, a whole range of items of information can be analyzed and assessed in the background without all details being output to the user specifically. For a sufficient suspicion, it is enough if the user receives, for example, a warning that a closer inspection of the identity is necessary in a particular case. This closer inspection can then be carried out separately using further aids and can optionally make use of more time/aids.

According to a further preferred embodiment example of the invention, the AR system has an output device, in particular an infoscreen of a pair of smartglasses, a head-up display or a screen. By a head-up display is meant an output device which projects items of information into the user's field of view. For example, through the use of a screen the items of information or results captured by means of the method according to the invention can be made available to further users.

Further, it is advantageous for one or more of the results of the check of the one or more first items of information of the security document to be output in visual, acoustic and/or tactile form by means of the AR system. It is hereby made possible for the results of the inspection process to be communicated to the user promptly according to a possible prioritization of the results. If, for example, the comparison of the one or more first items of information of the security document with the database reveals that they do not match, then an acoustic or visual advance notification in respect of the discrepancy can take place for example. The user's attention can also be increased, for example, by an output in tactile form.

According to a further preferred embodiment example of the invention, as a result of the check of the one or more first items of information a classification based on authenticity, in particular a probability of authenticity, is created. In order to classify an investigated security document as authentic, when the one or more first items of information are compared with the database it is not strictly necessary for there to be an absolute match, it is also possible to predefine tolerance ranges for admissible deviations. This applies in particular to optically captured items of information such as for example photographs or security features. Deviations need not necessarily indicate a forgery, as optical artifacts, perspective distortions, wear or dirtying of the security document during use, screening of a storage medium of the security document or similar effects can also occur during the capture of the one or more first items of information, which can impair the comparison with the database. In order to reduce such deviations, it is advantageous if aids are provided to make it easier for the user to carry out the method according to the invention. For example, the AR system can image one or more orientation frames in which the security document or parts of the security document should be placed. Alternatively or in addition to this, further optical aids or displays can be provided in order to reduce, for example, perspective distortions and/or contortions. For example, these can be movable crosshairs, register marks or registration marks or other elements which are to be positioned relative to each other by means of movement of the security document. Although this makes the application of the method more difficult for the user, it can improve the recognition rate for the security document.

The check of the one or more first items of information for authenticity can be improved if an image sequence of the security document with several individual images is optically captured. It is then checked whether at least one predefined item of the one or more first items of information is present in at least one individual image of the image sequence.

The image sequence preferably comprises a plurality of individual images of the security feature, in particular more than 2 individual images of the security feature. Furthermore, it is preferred if each individual image has more than 480×320 pixels, in particular more than 1920×1280 pixels.

The image sequence can be a plurality of discretely created individual images which have no temporal connection, but it can also be a film, thus consist of individual images which are taken at predefined time intervals, in particular at an acquisition frequency of from 5 to 60 images per second.

In a preferred embodiment, using at least two individual images of the image sequence it is checked whether the security document comprises an optically variable structure (security element) as security feature. This makes it possible to distinguish an authentic security element from a copy (e.g. a color copy), which only has a static—i.e. not optically variable—representation of the at least one predefined item of optical information. It is advantageous here to explicitly check that the respective individual image belongs or to define a predefined time interval between two individual images as a condition, in order that a user cannot use two separate individual images for deception in order to fake an optical variability.

Furthermore, the optically captured item of information can be broken down into several partial areas and then the respective partial areas are analyzed.

Furthermore, during the optical capture of the one or more first items of information, an angle between the capture device and the security document and/or an angle between a light source (e.g. a flash of the AR system) and the security document can be altered. By the angle between a light source and the security document is meant the angle of incidence of the light which illuminates the security document, relative to the surface normal of the security document. If the light source of the AR system is used, the angle of incidence of the light is relatively precisely matched to the optical axis of the capture device (running from the security document through a lens of the capture device to its image sensor). If the security document has an optically variable security element, its capturable/measurable appearance also changes when the observation angle and/or illumination angle is altered. In this way it can be verified firstly whether the security element of the security document captured in the image sequence is actually optically variable or whether it is a static copy of an OVD (OVD: optically variable device).

During the check of the one or more first items of information for authenticity it is preferably checked firstly whether one or more objects are present.

It is expedient if, to check whether one or more objects are present, an image recognition algorithm, in particular a Haar cascade algorithm, is used. Such algorithms allow a rapid and reliable classification of image contents.

The Haar cascade algorithm relates to the assessment of a plurality of so-called "Haar-like" features in an individual image. These are structures which are related to Haar wavelets, thus square wave trains with a predefined wavelength. In two dimensions, these are simply neighboring, alternating light and dark rectangular areas in the image. By shifting a rectangular mask over the individual image, the "Haar-like" features present are ascertained. The "Haar-like" features present are then compared with those which are supposed to be present in the object to be recognized. This can be carried out using a filter cascade.

The Haar cascade algorithm has the advantage of requiring particularly little computing time and few computer resources. However, it is also possible to use other image recognition algorithms.

The image recognition advantageously relates to a form of computational learning. For example, to check whether one or more objects are present, a comparison of the individual image with a previously acquired training data set can be carried out by means of the image recognition algorithm. The algorithm is not provided with any specific parameters, using which a classification of the image content is carried out, but rather the algorithm learns these parameters using the training data set.

To acquire the training data set, a plurality of images is preferably created, wherein a first subset of the images in each case has the object to be recognized and a second subset of the images in each case does not have the object to be recognized, and wherein each image of the first subset is allocated all the respective image coordinates of the features to be recognized of the object to be recognized.

Using the first and second subsets as well as the allocated image coordinates, a training of the image recognition algorithm is then preferably carried out. The algorithm hereby learns to classify the images correctly and, where necessary, to ignore disruptive factors intentionally introduced into the training data set, such as for example reflections in the images, random shading or the like. A rapid and reliable image recognition is hereby made possible.

Preferably, during the check of the one or more first items of information for authenticity, one or more features of at least one object of the one or more objects are determined, in particular by means of an image-processing algorithm.

Further, it is advantageous if at least one feature of the one or more features is constituted by the contours of the at least one object of the one or more objects and the image-processing algorithm is an edge detection algorithm.

As opposed to the above-described recognition of the presence of one or more objects, additional items of information are thus provided. In particular, the presence or absence of detailed features of the at least one object of the one or more objects can be checked using the ascertained contour. This provides further features which can contribute to the inspection of the security document.

An edge detection algorithm, in particular a Canny algorithm, is preferably executed to ascertain the contour. The Canny algorithm is a particularly resilient algorithm for edge detection and provides rapid and reliable results.

To apply the Canny algorithm to color images, these must first be converted into shades of gray. In grayscale images edges are characterized by strong fluctuations in lightness, i.e. a strong contrast, between neighboring pixels and can thus be described as discontinuities of the grayscale value function of the image.

As such discontinuities can also be caused by image noise, it is expedient if during the execution of the edge detection algorithm a noise filtering is carried out, in particular by means of a Gaussian filter with a preferred kernel size of from 3 to 7.

By kernel is meant here a convolution matrix which is applied to the item of image information. The convolution matrix of the Gaussian filter corresponds to normal distribution and acts as a low-pass filter. The grayscale value of a filtered pixel thus corresponds to the average of the grayscale values of the surrounding pixels weighted with the normal distribution up to a maximum distance defined by the kernel size. Smaller structures forming due to noise are lost, while the main structures of the imaged object are preserved.

Preferably, during the execution of the edge detection algorithm, an edge detection is carried out by applying a Sobel operator in at least one preferred direction of the individual image, preferably in two orthogonal preferred directions of the individual image.

The Sobel operator is likewise a convolution operator, which acts as a discrete differentiator. By convolving the image with the Sobel operator, the partial derivations of the grayscale value function in the two orthogonal preferred directions are obtained. The edge direction and edge strength can then be determined from this.

It is further preferred if an edge filtering is carried out during the execution of the edge detection algorithm. This can take place for example by means of a so-called "non-maximum suppression" which ensures that only the maxima along one edge are preserved, with the result that an edge perpendicular to its direction of extension is not wider than one pixel.

Furthermore, a threshold-based ascertaining of the image coordinates of the contour of the object is preferably carried out during the execution of the edge detection algorithm. It is thus ascertained from what edge strength a pixel is to count as an edge.

For this, for example, a hysteresis-based method can be used. Two threshold values $T_1$ and $T_2$ are established for this, wherein $T_2$ is greater than $T_1$. A pixel with an edge strength greater than $T_2$ is regarded as a constituent of an edge. All pixels with an edge strength greater than $T_1$ connected with this pixel are likewise assigned to this edge.

The image coordinates of all pixels belonging to an edge of the object in the investigated individual image are thus obtained. These can be analyzed further, for example in order to recognize simple geometric shapes.

According to a further preferred embodiment example of the invention, one or more items of additional information from the database are ascertained as at least one result of the inspection during the check of the one or more first items of information by comparison with the database. By items of additional information is meant here items of information which are not contained on the security document, but are transmitted from the database to the AR system. The user is hereby provided with further items of information which can be useful for carrying out the inspection process. For example, this relates to messages in respect of wanted individuals or further features with regard to the document holder.

The one or more items of additional information preferably comprise items of information about chronological references to already inspected security documents, hints relating to general circumstances/events, items of information regarding on-site incidents or incidents with locational/personal reference, cross references to further inspections/screenings of the security document, hints relating to the relationship field of the document holder, hints relating to further security features of the security document, hints to manually check the security features and statistics. It is thus possible, for example, for further captured items of information in respect of particular features/distinctive features of the document holder, which, for example, give information about missing limbs, also to be recorded in the database. It is likewise possible for items of situational information regarding the document holder within the framework of earlier inspections/screenings also to be recorded in the database, which items of situational information, for example, make it known that, deviating from the photograph on the security document and/or the recorded image in the database, with reference to an effective date/capture the document holder has short hair, whereby it thus cannot be possible, taking plausibility into account, that the document holder's hair is already long again after a short time interval.

Further, it is possible for the one or more items of additional information to comprise items of information about groups of individuals, so-called "clusters". Thus, for example, family members or tour groups can be allocated to a group of individuals and thus be captured or checked successively. This makes the inspection process easier or accelerates it. Thus, for example, it is possible, during the inspection of passengers who are coming from an airplane and in whose group of individuals a suspicious individual has been established, for further individuals of the same group of individuals who have one or more matching features to be subjected to a comprehensive inspection. High-risk groups can hereby be checked more comprehensively, whereby security is increased. A change, for example in the number of individuals in the cluster, can also be established. It is thus possible, for example, for a cluster of 5 individuals to travel into a country, but only 4 individuals to travel out again. Such an item of additional information can be used to carry out a more comprehensive inspection of the individuals of the cluster or to search for the missing individual if the suspicion is sufficient. In respect of the formation of clusters using one or more of the captured items of information, reference is made to further statements.

The one or more results preferably comprise results about personal data, in particular the name, the date of birth or the sex of the document holder, place of issue of the security document and status of the security document, in particular validity of the security document.

Further, it is advantageous for the document type to be determined as at least one result during the step of checking the one or more first items of information by comparison with a database. Through such a method, the assignment of the security document to a particular document type can be achieved. Thus, for example, it can be output directly to the user from which country the security document originates. If the document type cannot be determined, for example because the security document is unknown, an alarm signal can, for example, be output to the user or details of the document can be captured by means of the AR system, which details can be recorded in the database.

Further, it is possible for the security document, for example an ID document such as a passport or an identity card, to be identified using the machine-readable zone (OCR-B). By means of the comparison with the database (for example Keesing Documentchecker, IDENTT®, or the like), items of detailed information regarding the security document, for example regarding the individual features of an OVD of the security document, are then made available (for example specific movement effects/transformations/metamorphoses when tilted about a horizontal or vertical axis, colored or achromatic contrast changes when rotated through 90° or 180°, color changes when rotated through 90°, image changes wits two or three different motifs, the presence of items of nanoinformation, nanotexts, microtexts, intentional microtext errors, etc.). By means of these items of information additionally made available, a document inspection that is more effective and more precise ("complete"), i.e. more valuable in terms of security technology, is possible. In contrast, a visual inspection is often insufficient or only superficial, because the individual performing the inspection does not know which specific security element with which optical and other security functions is actually allocated to the respective security document. Because of the number of existing security elements on all the possible, different security documents, it is often difficult to recall precise knowledge about the specifically present security element and its specific properties from memory in each case. This is the case in particular given the short time, of approx. from 15 to 20 seconds on average, which is available for the inspection.

According to a further preferred embodiment example of the invention, the method furthermore comprises the step of capturing one or more third items of information of the spatial context.

The one or more third items of information are preferably items of visual, acoustic, thermal or chemical information of the spatial context. As opposed to the above-described capture of one or more first and/or second items of information, additional items of information of the spatial context are thus provided. In particular, the number of features which contribute to the inspection of the security document can be further increased using the one or more third items of information of the spatial context. Thus, for example, the license plate number of the document holders vehicle can also be captured within the framework of a plausibility check.

Further, it is advantageous if the one or more third items of information are captured by means of one or more microphones, humidity sensors, photodetectors or temperature sensors. The one or more third items of information captured by means of these sensors or detectors can thus be present in digital and analog signal form. For example, analog signals can be converted into digital signals and vice versa by means of an A/D converter or D/A converter respectively. These can be processed further for example by means of signal-processing methods.

Further, it is possible for one or more of the capture devices of the AR system to be one or more microphones, humidity sensors, photodetectors, or temperature sensors.

Further, it is also possible for a comparison, in particular for plausibility, of one or more of the first items of information and/or one or more of the second items of information with one or more of the third items of information to be carried out by comparison with the database. This makes it possible to improve the inspection of the security document because, as already described above, the number of features which contribute to the inspection of the security document is further increased. When the one or more third items of information are compared with the database it is not strictly necessary for there to be an absolute match, it is also possible to predefine tolerance ranges for admissible deviations. Deviations in respect of one or more third items of information can, in addition to what has already been described above for the items of visual information, also represent, for example, background noises, such as traffic noise, to the items of acoustic information for example. Such sources of interference can be reduced from the signal processing, for example, by means of suitable filter methods.

Further, it is possible to form one or more groups of individuals, so-called "clusters", as described above, using the one or more third items of information. Thus, for example, it is possible to allocate individuals in a motor vehicle or an airplane to one group of individuals. It is thus possible for a cluster of individuals to be formed, using the one or more items of additional information from the database, as described above, or to be formed through one or more third items of information of the spatial context. The corresponding data, about the group of individuals formed using the one or more third items of information, can be stored for example in the database. Thus, for example, it is possible to compare one or more of the second items of information with the items of information about a cluster which was formed using one or more of the third items of information, in order to interpret the one or more of the second items of information better.

Advantageously, the method or the AR system acts as a support during the inspection of the security document. Thus, it is possible for example, within the framework of identity checks, for questions to be suggested for a dialogue between the user and the document holder. Such a questioning can capture e.g. one or more second items of information about the document holder. Thus, it is possible for the user to be shown, for example, a country or regional map which corresponds to the country of origin and/or the place of birth of the document holder. This makes it possible for the user, for example, to ask so-called trick questions which can reveal logical discrepancies between the document holder's answer and the items of information that the method or the AR system has available. Thus, for example, a time specification given by an individual to be checked in respect of a journey time can be inspected firstly by the suggestion of the question in respect of the journey time and secondly by the determination of the answer by the AR system. For example, according to the timetable a train journey lasts approx. 1 h, but the individual to be checked indicates that it took more than 2 h by train. The time specification from the timetable can be retrieved, for example, from the database. It is hereby made possible to expose discrepancies in the statements of an individual to be checked and thus to further improve the check. Corresponding items of information from dialogues are also already used today as a means of investigating the coherence of items of information, for example, within the framework of an identity check. The present invention makes a more far-reaching, more interactive and more complex utilization of dialogues for checking a security document possible. It is possible here for the AR system to output to the user specifications, preferably in the form of guidelines, in acoustic form, in particular by means of earphones (not audible to the document holder). However, the guidelines can also be output in visual and/or tactile form.

According to a further preferred embodiment example of the invention, the method furthermore comprises the step of capturing one or more fourth items of information, in particular position and/or location determination of the AR system in the area.

Preferably, the one or more fourth items of information are determined by a global position-determining system, in particular GPS, Galileo, GLONASS or BeiDou, via location-specific communications networks such as WLAN or other transmitting stations (for position determination) and/or by at least one acceleration sensor and/or orientation sensor. Through such a design, additional items of information in respect of the position and/or location determination of the AR system in the area are thus provided. For example, one or more fourth items of information in respect of the position determination can be consulted for location-related references to a previous inspection of the security document already carried out or cross references to locations of other inspections by other users can be produced. Furthermore, it is possible here, for example, for a camera of the AR system to recognize how the security document and thus the optical security feature is being held and moved. Advantageously, the presence, the position, the illuminance from any sources of light occurring are additionally also measured with corresponding sensors, such as for example directional light sensors. Knowing these movements and the details of the security features, the user can be shown a realistic animation of the security feature to be verified. This makes the verification process much easier (in view of the large number of different security documents with optical security features) and increases the probability of rapidly and clearly recognizing forgeries. In comparison with an inspection from memory, smaller differences between an original and a forgery can hereby be recognized. The practical value of the optical security features in respect of protection against forgery is thus increased hereby.

Preferably, at least one of the capture devices of the AR system is a position-determining system, in particular GPS, Galileo, GLONASS or BeiDou system, and/or an acceleration sensor and/or an orientation sensor.

Furthermore, it is advantageous, during the step of checking the one or more captured first, second, third or fourth items of information, to use algorithms which advantageously relate to a form of computational learning, as described above. Thus, for example, an image-recognition algorithm can learn e.g. the features of a document type (for example typical passport layouts) using a training data set. On the basis of these learnt features, the above check can be carried out more rapidly and/or more precisely. This can be used, for example, to rapidly check the one or more first, second, third or fourth items of information. It is thus possible, during the inspection of a security document, in a first step, for one or more of the first, second, third or fourth items of information to be inspected, for example by means of an algorithm based on a form of computational learning, and in a second step, optionally depending on the result of the first step, for one or more of the one or more first, second, third or fourth items of information to be additionally checked manually for example.

Further, it is advantageous, if one or more of the one or more captured first, second, third or fourth items of information are not present in the database, to store these captured items of information in the database and to consult them for further inspections or to inspect these together with further items of information for plausibility.

Further, it is advantageous for the one or more first items of information and/or second items of information to be optically captured by means of one or more optical image-capture devices, in particular a camera. The one or more optical image-capture devices are, as a rule, cameras, for example CCD cameras (CCD: charged coupled device). CCD arrays, thus arrangements of CCDs, in which individual CCDs are arranged in a two-dimensional matrix are preferably used. The images generated by such a camera are then present in the form of a pixel matrix, wherein each pixel corresponds to an individual CCD of the camera. The CCD camera preferably has, in each case, separate CCDs for the colors red, green and blue (RGB), whereby these individual colors or colors mixed from them are particularly easy to detect. Alternatively or in addition to this, of course, further image-capture devices, such as for example CMOS cameras (CMOS: complementary metal-oxide semiconductor), laser scanners, TOF cameras (TOF: time-of-flight) can be used. Individual images are preferably captured with a resolution of from 2 to 20 megapixels, preferably 5 to 10 megapixels. Further, it is advantageous to acquire an image sequence with a plurality of individual images. The image sequence can be a number of discretely captured individual images which have no temporal connection, but it can also be a film, thus consist of individual images which are taken at predefined time intervals, preferably at an acquisition frequency of from 5 to 500 images per second, further preferably at an acquisition frequency of from 5 to 60 images per second. Image sequences are preferably captured with 480×320 pixels, preferably 1920×1280 pixels, further preferably 1920×1080 pixels. The acquisition of image sequences is particularly advantageous for capturing optically variable security elements (OVD: optically variable devices). OVDs are elements which display different optical effects under different observation or illumination conditions.

Further, it is advantageous if at least one image-capture device of the AR system is a camera, in particular a CCD camera or CMOS camera.

The above-named image-capture devices can operate in the spectral range which is directly perceptible to the human eye or also outside this spectral range, for example in the IR or UV spectrum. The one or more captured first items of information and/or second items of information can thus be captured in the spectral range directly perceptible to the human eye. It is likewise possible for the optical sensitivity of the image-capture devices to be increased particularly in order e.g. to operate under particularly dark ambient light conditions. It is also possible for the one or more first items of information and/or second items of information to be captured for example by means of an image converter and/or low-light amplifier.

Further, it is advantageous for the AR system to be formed as a pair of smartglasses. Through such a design, a particularly user-friendly and flexible performance of the method according to the invention is possible.

Before the capture of one or more first items of information of the security document by means of the AR system, in particular a pair of smartglasses, the illuminance is preferably measured and a light source of the AR system is activated at an illuminance of less than 800 lx. This can be carried out automatically by the AR system or manually by the user. It is hereby ensured that the security document is illuminated sufficiently to make a reliable inspection possible. An illuminance of 800 lx corresponds approximately to an office with normal lighting. Further, it is possible for example for reference values for specific security documents to be recorded in the database and for the adaptation of the illuminance to be carried out automatically after recognition of the security document.

Further, it is advantageous if the comparison with the database is carried out via an internet connection, in particular a wireless internet connection. The flexibility of the method according to the invention is increased by such a design. The comparison with the database is preferably carried out via a secure internet connection. Thus, the transmitted data can be transmitted for example in encrypted form. The encryption is preferably carried out by an encryption algorithm.

The control device of the AR system preferably has a communication interface for accessing, in particular wirelessly accessing, the database.

According to a further preferred embodiment example of the invention, the database and/or parts of the database are recorded on the control device of the AR system, in particular stored on a storage medium of the control device of the AR system. This enables a location-independent application of the use according to the invention of the AR system, for example within the framework of identity checks. Furthermore, it is also possible, as described above, for the comparison with the database to be carried out via a wireless communication, for example via a wireless internet connection, in order to enable a location-independent application of the use according to the invention of the AR system.

BRIEF DESCRIPTION OF THE DRAWINGS

Embodiment examples of the invention are explained below by way of example with the aid of the attached figures.

DETAILED DESCRIPTION OF THE INVENTION

Figure 1:
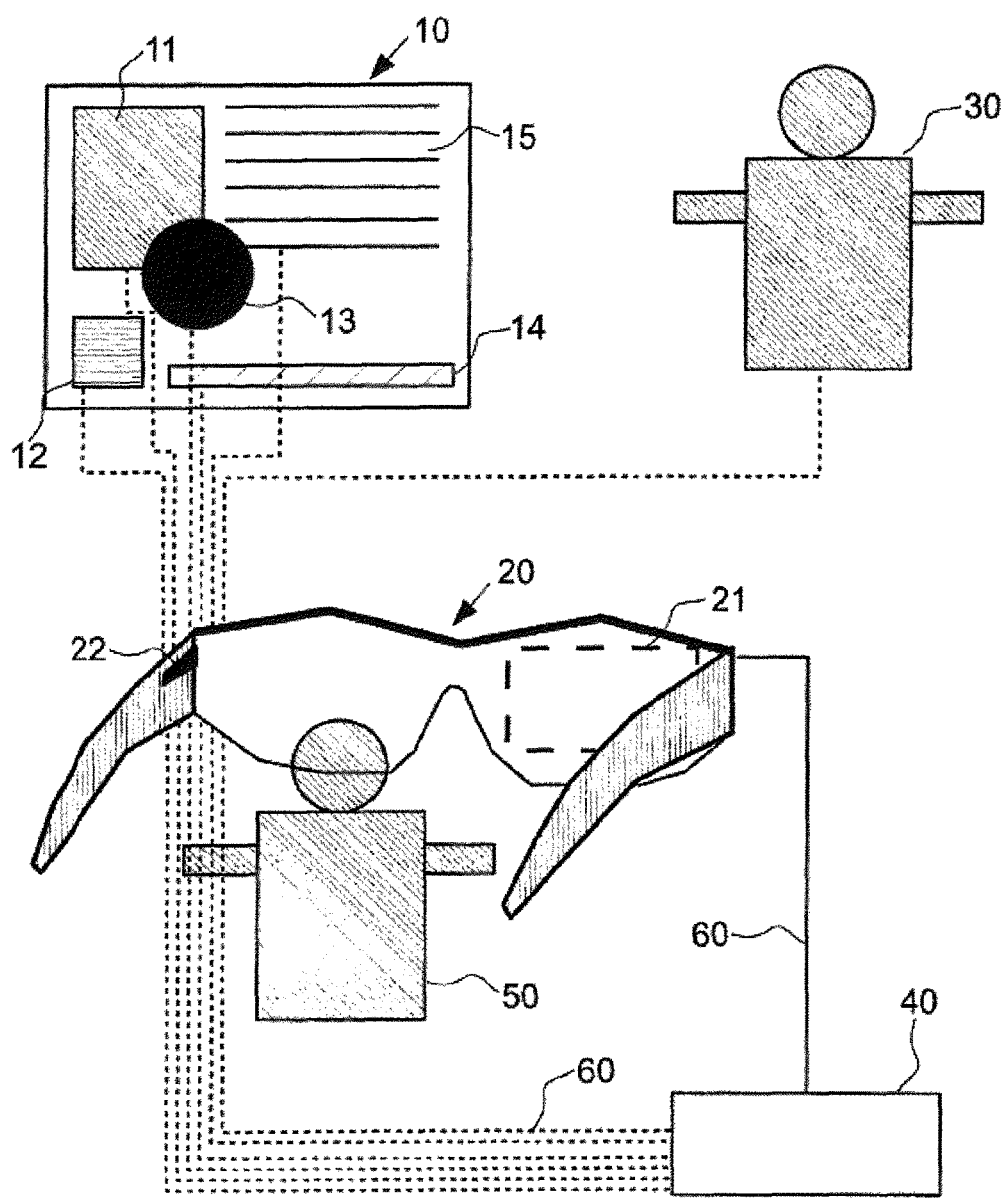
FIG. 1 shows a schematic representation to illustrate a method for inspecting a security document by means of an AR system.

FIG. 1 shows a schematic representation of an inspection process of a security document 10 by means of an augmented reality system 20.

In the following the abbreviation AR system 20 is to stand and be used for augmented reality system 20.

The security document 10 can be, for example, a passport, a visa, a birth certificate, a banknote, an identification document, a security, a credit card, a ticket or a voucher. Thus it is possible for the security document 10 to originate from the public, governmental and private sectors.

The security document 10, for example an identity card, preferably comprises a photograph 11, a storage medium 12, a security element 13, coded identifiers 14, in particular a machine-readable zone, and an area 15 with personal data, such as for example name, address and date of birth of the document holder 30.

The area of the coded identifiers 14 has, for example, OCR-B font, which codes for example the identification number.

The security element 13 is preferably an optically variable security element and can comprise, for example, a relief structure, in particular a diffractive structure, linear or crossed sine-wave grating structures or binary grating structures, asymmetrical blazed grating structures, a superimposition of a macrostructure with a diffractive and/or mat microstructure, zero-order diffraction structures, blazed gratings, macrostructures, in particular lens structures or microprism structures, mirror surfaces, mat structures, in particular anisotropic and isotropic mat structures, thin-film layer elements or liquid-crystal layers for generating color-shift effects dependent on the angle of view, volume holograms or optically variable pigments comprising layers/indica and/or luminescent, photochromic, electrochromic or thermochromic substances. Combinations of the named structures as well as further security elements 13 are also possible. In particular through combinations of one or more of the above-named security elements, an OVD (OVD: optically variable device) with a particularly high level of protection against forgery can be provided, because a forger has to readjust this specific combination, which substantially increases the degree of technical difficulty of the forgery. OVDs are elements which display different optical effects under different observation or illumination conditions.

Depending on the document type, the security document 10 can also have other or further items of information or features. For example, the security document 10 can comprise symbols, logos, images, signs, alphanumeric characters or numbers.

By AR system is to be meant any device which augments a user's perception of reality by means of technical aids. In addition to the already mentioned pair of smartglasses, tablet, smartphone or PDA (PDA=Personal Digital Assistant), other devices can, of course, also be used. For example, it is also possible, instead of the named multipurpose devices, also to use devices which are designed specifically only for carrying out this method. For example, an existing pair of smartglasses can be adapted to carrying out the method according to the invention by adapting the software and/or hardware.

The AR system 20 has one or more capture devices, in particular the capture device 22, a control device, in particular the control device 24, and preferably one or more output devices, in particular the output device 21.

The AR system 20, for example a pair of smartglasses, thus comprises for example the output device 21, for example an infoscreen. The infoscreen here presents to the human eye visual overlays, for example by means of a waveguide and a correspondingly molded reflector.

Furthermore, the AR system 20 comprises, for example, the capture device 22, such as for example a camera, which detects images with a resolution of 5 megapixels in a wavelength range of from 380 nm to 3 µm and thus also captures both the spectral range visible to the human eye and the near-infrared range. Through such a design it is possible to capture items of information not visually recognizable to the human observer from the near-infrared range. The camera is furthermore designed such that it can also acquire image sequences with an acquisition frequency of 100 Hz and 1920×1080 pixels. Furthermore, the capture device 22 preferably comprises a device for reading the storage medium 12, such as for example an RFID reader. The RFID reader makes a contactless reading of the storage medium 12 possible.

The user 50, for example a police officer or a customs officer, by means of the capture device 22 of the AR system 20, now captures the security document 10 and the document holder 30 by taking a picture of the security document 10 and of the document holder 30. By capture is meant here the detection of the one or more items of information by means of the capture device 22. The image acquisition can be initiated, for example, by a touch-sensitive sensor of the AR system 20, such as for example a touchscreen.

Furthermore, the storage medium 12 of the security document 10 is read. The reading of the storage medium 12 can likewise be initiated by a touch-sensitive sensor.

The individual items of information or features, such as the photograph 11, the security element 13, the coded identifier 14 and the area 15 with the personal data, can be captured in a total picture or sequentially as individual images having the individual features or items of information.

The captured items of information in the form of the images of the security document 10, of the document holder 30 and of the items of information of the storage medium are transmitted by the control device of the AR system 20 via a communication connection 60 to a database 40. Alternatively, the items of information allocated to these items of information in the database 40 are requested by the control device of the AR system from the database 40 via the communication connection 60 for the comparison.

The communication connection takes place for example via a wireless internet connection by means of UMTS, LTE or GPRS. However, it is also possible for the communication connection 60 to be wired. Further communication connections, such as for example via satellite, or local connections, such as for example Bluetooth or WLAN, are likewise possible. Further, it is possible for the database 40 or a part of the database 40 to be contained locally in the AR system.

The database 40, for example a host computer or a so-called cloud made of a plurality of networked, jointly computing standalone computers, and/or the control device of the AR system 20, now carries out a comparison of the received items of information with allocated items of information recorded on the database 40.

The document type is firstly determined, for example, using the OCR-B font in the coded identifier 14.

If the document is known, the further items of information can be checked for authenticity. In the process it is firstly checked whether the items of information or features allocated to the document type are present. These items of information or features are typically present in the form of one or more objects or motifs, such as for example the photograph 11 or the security element 13, on the security document.

It is expedient if an image recognition algorithm, in particular a Haar cascade algorithm, is used to check whether one or more objects are present. Such algorithms allow a rapid and reliable classification of image contents.

The Haar cascade algorithm is based on the assessment of a plurality of so-called "Haar-like" features in an individual image. These are structures which are related to Haar wavelets, thus square wave trains with a predefined wavelength. In two dimensions, these are simply neighboring, alternating light and dark rectangular areas in the image. By shifting a rectangular mask over the individual image, the "Haar-like" features present are ascertained. The "Haar-like" features present are then compared with those which are supposed to be present in the object to be recognized, such as for example the photograph 11 or the security element 13. This can be carried out using a filter cascade.

The Haar cascade algorithm has the advantage of requiring particularly little computing time and few computer resources. However, it is also possible to use other image recognition algorithms.

A form of computational learning is used for the image recognition. The algorithm is not provided with any specific parameters, using which a classification of the image content is carried out, but rather the algorithm learns these parameters using the training data set.

In order to create the training data set, a number of images are acquired, wherein a first subset of the images has, in each case, the object to be recognized, such as for example the photograph 11 or the security element 13, and a second subset of the images does not have, in each case, the object to be recognized, such as for example the photograph 11 or the security element 13, and wherein each image of the first subset is allocated all the respective image coordinates of the features to be recognized of the object to be recognized, such as for example the photograph 11 or the security element 13.

Using the first and second subsets as well as the allocated image coordinates, a training of the image recognition algorithm is then carried out. The algorithm hereby learns to classify the images correctly and, where appropriate, to ignore disruptive factors intentionally introduced into the training data set, such as for example reflections in the images, random shading or the like.

If the presence of the object to be recognized, such as for example the photograph 11 or the security element 13, can be confirmed, the contour is then ascertained from at least one object, such as for example the photograph 11 or the security element 13. As opposed to the above-described simple image recognition which only supplies a yes/no classification or a probability for whether the object to be recognized, such as for example the photograph 11 or the security element 13, is present in the individual image, additional items of information are thus provided. In particular, using the ascertained contour, the presence or absence of detailed features of the object to be recognized, such as for example the photograph 11 or the security element 13, can be checked. This provides further features which can contribute to the inspection of the security document.

In order to determine the contour of the object to be recognized, such as for example the photograph 11 or the security element 13, an edge detection algorithm such as the Canny algorithm can be used.

To apply the Canny algorithm to color images, these must first be converted into shades of gray. In grayscale images edges are characterized by strong fluctuations in lightness between neighboring pixels and can thus be described as discontinuities in the grayscale value function of the image.

As such discontinuities can also be caused by image noise, it is expedient if during the execution of the edge detection algorithm a noise filtering is carried out, in particular by means of a Gaussian filter with a preferred kernel size of from 3 to 7.

By kernel is meant here a convolution matrix which is applied to the item of image information. The convolution matrix of the Gaussian filter corresponds to normal distribution and acts as a low-pass filter. The grayscale value of a filtered pixel thus corresponds to the average of the grayscale values of the surrounding pixels weighted with the normal distribution up to a maximum distance defined by the kernel size. Smaller structures forming due to noise are lost, while the main structures of the object to be recognized, such as for example the photograph 11 or the security element 13, are preserved.

Preferably, during the execution of the edge detection algorithm, an edge detection is carried out by applying a Sobel operator in at least one preferred direction of the individual image, preferably in two orthogonal preferred directions of the individual image.

The Sobel operator is likewise a convolution operator, which acts as a discrete differentiator. By convolving the image with the Sobel operator, the partial derivations of the grayscale value function in the two orthogonal preferred directions are obtained. The edge direction and edge strength can then be determined from this.

After the differentiation of the grayscale value data, an edge filtering is then is carried out. This can take place for example by means of a so-called non-maximum suppression, which ensures that only the maxima along one edge are preserved, with the result that an edge perpendicular to its direction of extension is not wider than one pixel.

After the filtering, a threshold-based ascertaining of the image coordinates of the contour of the object to be recognized, such as for example the photograph 11 or the security element 13, can then be carried out. It is thus ascertained from what edge strength a pixel is to count as an edge.

For this, for example, a hysteresis-based method can be used. Two threshold values $T_1$ and $T_2$ are established for this, wherein $T_2$ is greater than $T_1$. A pixel with an edge strength greater than $T_2$ is regarded as a constituent of an edge. All pixels with an edge strength greater than $T_1$ connected with this pixel are likewise assigned to this edge.

The image coordinates of all pixels belonging to an edge of the object to be recognized, such as for example the photograph 11 or the security element 13, in the investigated individual image are thus obtained. These can be analyzed further, for example in order to recognize simple geometric shapes.

In addition to the above-described comparison of the images of the security document 10 and of the document holder 30 with the allocated items of information stored in the database 40, the item of information of the storage medium 12 is likewise compared with items of information recorded on the database 40 and with already captured items of information, preferably by the control device of the AR system 20.

For this, it is inspected whether, for example, a photograph of the document holder 30 recorded on the storage medium 12 matches the captured photograph of the document holder 30 and the photograph 11 on the security document 10. In respect of the check for such a match, reference is made to the above statements regarding the image-processing algorithms. Furthermore, a photograph additionally recorded in the database 40 can be consulted for a further comparison with the photograph 11 on the security document 10.

The results of the check or the data required for the check are transmitted from the database to the AR system 20 via a communication connection 60 and output to the user 50 via the output device 21. Thus, for example, discrepancies/conflicts on the security document, security features containing deviations or discrepancies, content-related items of information or anatomical-physiological features can be shown to the user 50 by means of the output device 21. Furthermore, the results can be stored on the database 40.

In addition to the results of the check, the captured items of information of the security document 10 can also be output to the user 50. Thus, for example, the captured items of information can be output, according to their relevance for the user 50, by means of the output device 21 of the AR system 20.

Figure 2:
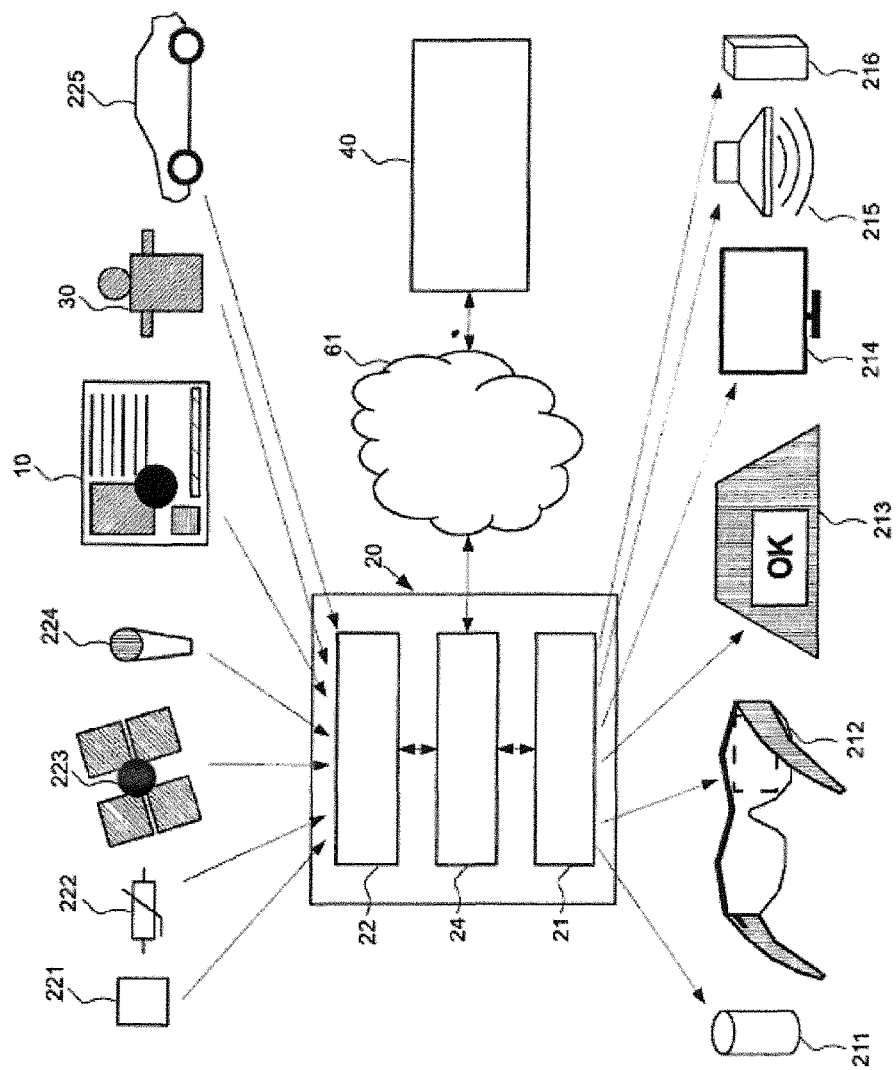
FIG. 2 shows a schematic representation of a system for carrying out the method according to FIG. 1.

FIG. 2 shows a schematic representation of an inspection system with the AR system 20. The AR system 20 has the capture device 22, the output device 21 and the control device 24.

The capture device 22 here captures a plurality of different items of information. These items of information can be captured by means of suitable sensors, such as for example cameras, position-determining systems, temperature sensors, microphones, humidity sensors or photodetectors. Thus, the capture device 22 in FIG. 2 is designed such that it captures items of information about the air humidity 221 and the temperature 222 of the environment in the area, the position 223 of the AR system 20, acoustic signals 224 of the environment in the area, of a security document 10, of a document holder 30 and of a vehicle 225. It is hereby possible, for example, to include further items of information in the inspection process in addition to the items of information of the security document 10 and of the document holder 30. Thus, for example, within the framework of a vehicle spot-check, the license plate number of the vehicle 225 of the document holder 30 can be included in the inspection process and, for example, a plausibility check can be carried out.

In respect of a possible design of the security document 10, reference is made to the statements regarding FIG. 1.

The control device 24 checks the items of information captured by the capture device 22 by comparison with the database 40. For this, the captured items of information can be transmitted via a communication interface to the database 40 or items of information allocated to the captured items of information can be requested from the database 40.

The control device preferably comprises a hardware platform, preferably with one or more processes, a memory and one or more output modules; a software platform, in particular comprising an operating system; and one or more application programs running thereon, which provide the functions of the control device when they are executed.

Furthermore, in respect of the check of the items of information, reference is made to the statements regarding FIG. 1.

The check of the captured items of information can, as already stated above, is carried out in the control device 24. The data required for the check are here retrieved from the database 40. Likewise, for example, computationally intensive checks such as for example the check of images for authenticity can be carried out in the database 40, whereas, for example, checks of character strings are carried out in the control device 24.

Furthermore, it is possible for the database and/or parts of the database to be recorded on the control device 24 of the AR system 20, in particular a storage medium of the control device 24 of the AR system 20. This enables a location-independent application of the AR system 20, for example within the framework of identity checks.

Furthermore, it is possible for the AR system 20 to have a device, such as for example a photodiode, in order to measure the illuminance. If the illuminance falls below a predetermined threshold value, preferably of less than 800 lx, a light source of the AR system 20 is activated, with the result that a sufficient illumination of the security document 10 is guaranteed. The light source of the AR system 20 is preferably an arrangement of LEDs which, in particular, irradiate white light, in particular daylight.

The comparison with the database 40 is preferably carried out via a secure internet connection 61. Thus, the transmitted data can be transmitted for example in encrypted form. Encryption algorithms are used for the encryption.

The results of the check are output by means of the output device 21. The output of the results of the check can, as shown in FIG. 2, take place on a storage medium 211. This storage medium 211 can be, for example, a transportable storage medium such as a USB memory stick or a hard drive. The output can take place in visual form via an infoscreen 212 of a pair of smartglasses, via a head-up display 213 or via a screen 214. The output can furthermore take place in acoustic form via a loudspeaker 215. Thus, for example, an output to a user of the AR system 20 can take place by means of a headphone. It is likewise possible for the output to a user to take place in tactile form, for example through a piezo element 216 which exerts a pressure stimulus on the user.

Figure 3:
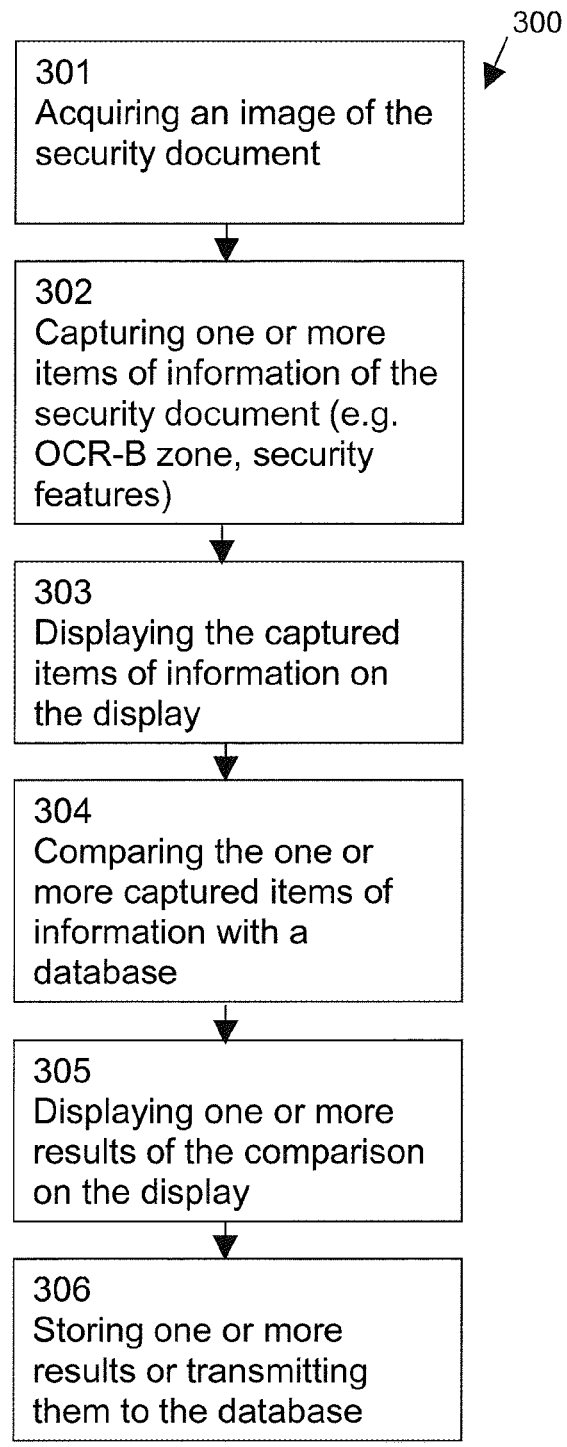
FIG. 3 shows a flowchart of an inspection process.

FIG. 3 shows a flowchart. The flowchart of FIG. 3 presents an example of a sequence of an inspection process 300 which is controlled by the control device 24. The inspection process 300 can, of course, be augmented by the capture of further items of information such as described for example in FIG. 2. The results can also be output, according to the above statements, in visual, acoustic and/or tactile form.

In step 301 an image is firstly taken of the security document by the capture device 22, controlled by the control device 24. This takes place for example by means of a camera of a pair of smartglasses.

In step 302 one or more items of information, such as for example the machine-readable zone, of the security document are captured. Thus, for example, the document type can be determined by means of the machine-readable zone or personal data can be captured.

In step 303 the one or more captured items of information, controlled by the control device 24, are preferably output by means of the output device 21, for example displayed on a display, such as for example the infoscreen of the smartglasses. Here, the one or more captured items of information can be displayed, for example, according to their relevance for the inspection process. The relevance for the inspection process is established for example by the document type. Thus, in an identity check, for example, the name and the address of the document holder can be displayed first.

In step 304 the one or more captured items of information are checked by the control device 24 by comparison with the database 40. In respect of the check of the one or more captured items of information by comparison with the database, reference is made to the above statements.

In step 305, controlled by the control device 24, one or more results of the check of the one or more captured items of information are output by means of the output device 20, for example displayed by means of a display. It is advantageous here to order the one or more results in respect of their priority. Thus, for example, discrepancies or a hint that this is a wanted individual can be listed first.

In step 306, controlled by the control device 24, one or more of the results of the check of the one or more captured items of information are stored and/or transmitted to the database 40. If checks have been carried out, for example, by the control device 24, the results of the check are preferably transmitted to the database 40 and stored there.

Advantageous detailed embodiments of the inspection process 300 are explained below with reference to the diagrams of FIG. 4 to FIG. 7:

FIG. 4 to FIG. 7 represent the capture and inspection of a security document by means of an AR system. The AR system 401 for carrying out the process specified in FIG. 4 to FIG. 7 here is preferably designed like the AR system 20 according to FIG. 1 and FIG. 2, with the result that, regarding this, reference is made to the above statements. The AR system 401 preferably has a link to a database and can here be used in a stationary manner, for example by security personnel at airports or border officials, or in a transportable/mobile manner, for example in the case of identity checks or vehicle spot-checks.

Figure 4:
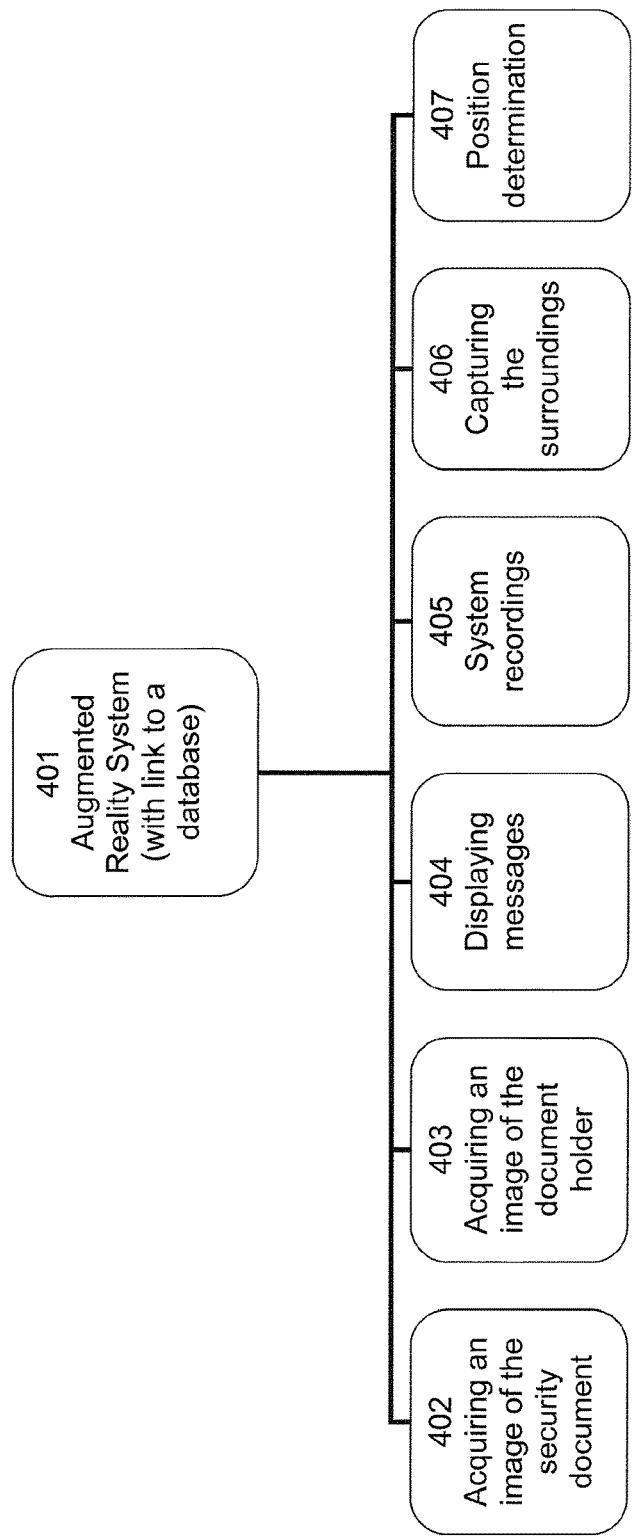
FIG. 4 to FIG. 7 show diagrams which specify an inspection process.
Figure 5:
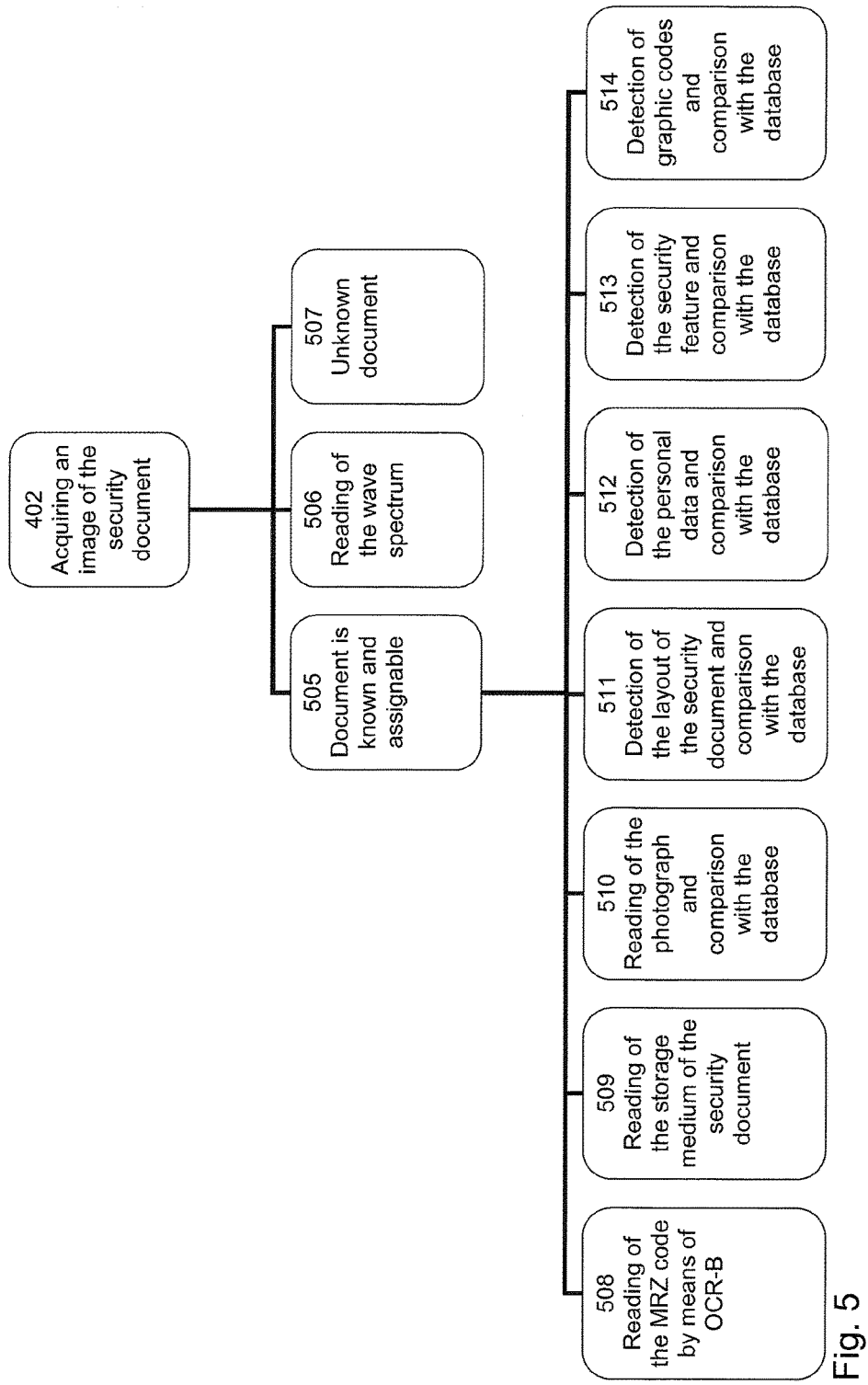

In a step 402, the AR system 401 firstly captures the security document, as shown in FIG. 4. Here, as shown in FIG. 5, in a step 505 it is firstly established whether the security document is known or assignable. If the security document is known and assignable, the items of information of the security document are read.

Thus, for example, the machine-readable zone (or MRZ) can be read in a step 508. OCR-B font is used, for example, for the font for the machine-readable zone. In OCR-B font, each character has the same letter-spacing and is thereby designed specifically to be readable for machines.

If the machine-readable zone is capturable or decipherable, the item of information of the machine-readable zone is compared with the database. It is possible here, for example, for the result of the comparison to yield a hint or to contradict further items of information of the security document, with the result that an alarm is output to the user. It is also possible for further items of information in relation to the checked security document to be recorded in the database, such as for example a missing person report or a manhunt notice, with the result that a corresponding alarm is output to the user. If all of the checked items of information are authentic or no further items of information are recorded in the database, a corresponding hint is output to the user.

If the machine-readable zone is not capturable, a corresponding warning is output to the user. Furthermore, a comparison with the database is carried out in order to establish whether this discrepancy is already known or has been captured for the first time.

By not capturable is meant here that the check by comparison with the database has discovered deviations or discrepancies or that the items of information cannot be captured because of disruptive factors such as dirt and/or screening.

Furthermore, for example, in a step 509 the storage medium of the security document can be read. The storage medium can contain items of biometric information, such as for example fingerprints, body measurements or a photograph of the document holder.

If the content of the storage medium of the security document is capturable or decipherable, the item of information of the storage medium is compared with the database. It is possible here for example for the result of the comparison to yield a hint in respect of discrepancies or to contradict further items of information of the security document, with the result that a corresponding alarm is output to the user. It is also possible for further items of information in relation to the checked security document to be recorded in the database, such as for example a missing person report or a manhunt notice, with the result that a corresponding alarm is output to the user. If all of the checked items of information are authentic or no further items of information are recorded in the database, a corresponding hint is output to the user.

If the content of the storage medium of the security document is not capturable, a corresponding warning is output to the user. Furthermore, a comparison with the database is carried out in order to establish whether this discrepancy is already known or has been captured for the first time.

Furthermore, for example, in a step 510 the photograph on the security document can be captured and compared with the database.

Here, it is checked firstly whether the photograph is congruent for example with one recorded in the database. If, furthermore, as represented in FIG. 4, optionally in a step 403, an image of the document holder has been captured, this can likewise be inspected for a match to the photograph recorded in the database and/or the photograph on the security document in a step 510. If the photograph on the security document does not match the photograph of the document holder, a hint relating to manual checking for example can be displayed. It is also possible for further items of information in relation to the checked security document to be recorded in the database, such as for example a missing person report or a manhunt notice, with the result that a corresponding alarm is output to the user. If all of the checked items of information are authentic or no further items of information are recorded in the database, a corresponding hint is output to the user.

If the photograph on the security document is not capturable, a corresponding warning is output to the user.

Furthermore, for example, in a step 511 the document layout of the security document can be detected and compared with the database.

If the document layout is assignable to a document type and does not contradict further items of information of the security document, a corresponding hint is output to the user. If the result of the comparison yields a hint or contradicts further items of information of the security document, a corresponding alarm is output to the user.

If the document layout is not assignable to a document type, a corresponding warning is output to the user. Furthermore, a comparison with the database is carried out in order to establish whether this discrepancy is already known or has been captured for the first time.

Furthermore, for example, in a step 512 the area with personal data of the security document can be read and compared with the database.

If the personal data match the data recorded in the database or do not contradict further items of information of the security document, a corresponding hint is output to the user. If the result of the comparison with the database yields a hint in respect of discrepancies or contradicts further items of information of the security document, a corresponding alarm is output to the user. It is also possible here not only for a distinction to be made between a hint or warning, but e.g. for a measured value (e.g. a number between 0 and 100) to be output which is a measure of whether the security document belongs to the document holder. This would supply to the user additional items of information about whether the hint or warning is assured.

If the personal data of the security document cannot be captured, a corresponding warning is output to the user. Furthermore, for example, if there is a contradiction within the personal data, a hint in respect of the discovered deviation can be output.

Furthermore, for example, in a step 513 the security elements of the security document can be captured and compared with the database.

Here, the presence of the security elements on the security document is firstly checked. This can be carried out, for example, via recognition of the shape by means of image-processing algorithms such as for example the Haar cascade algorithm or the Canny algorithm. In respect of these two algorithms, reference may be made here to the above statements. Furthermore, other image-recognition algorithms can also be used. The check of the presence of the security elements of the security document can reveal for example that the security elements of the security document match the security elements of the security document recorded in the database or contradict the security document. The user receives a corresponding hint regarding this.

It is also possible for the database to comprise further items of information in relation to the checked security element of the security document, such as for example an animation of the security element, in particular in the case of special optical effects of an OVD dependent on the angle of view or angle of illumination, or items of detailed information of the security element.

It is also possible here for the database to comprise, in addition to the additional items of information in respect of the security elements, further items of information which are ascertained during the inspection process. In respect of these further items of information, reference may be made to the further statements and to the above statements.

If the security elements are not capturable, a corresponding warning is output to the user. Furthermore, a comparison with the database is carried out in order to establish whether this discrepancy is already known or has been captured for the first time.

Furthermore, for example, in a step 514 graphic codes of the security document can be read and compared with the database. Graphic codes can be for example guilloches or other special patterns, motifs or ornaments.

It is possible here for example for the result of the comparison of the graphic codes with the database to yield a hint in respect of discrepancies or to contradict further items of information of the security document, with the result that a corresponding alarm is output to the user. It is also possible for further items of information in relation to the checked security document to be recorded in the database, such as for example hints relating to forgeries, with the result that an alarm is output to the user. If all of the checked items of information are authentic or no further items of information are recorded in the database, a corresponding hint is output to the user.

If the graphic codes of the security document are not capturable, a corresponding warning is output to the user. Furthermore, a comparison with the database is carried out in order to establish whether this discrepancy is already known or has been captured for the first time.

If the security document is not known, in a step 507 a corresponding alarm is output to the user. Optionally, a detailed capture of the security document can be carried out in order to include the features of the unknown security document in the database. Furthermore, a comparison of the detailed capture of the security document with the database can be carried out in order to establish whether particular features of the unknown security document are already known.

It is also possible to capture the wave spectrum of the security document in a step 506. The captured wave spectrum can be compared with the database, for example for matches with the document type. The results of the check can displayed shown to the user.

Figure 6:
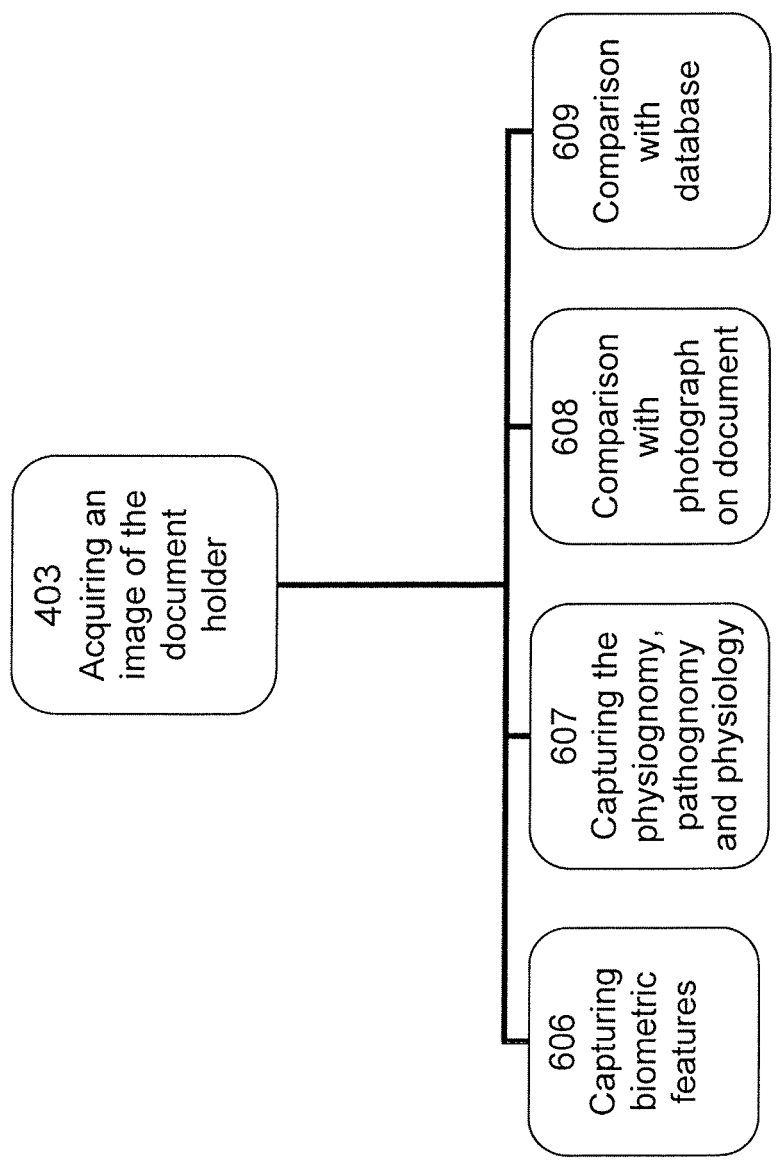

Optionally, in a step 403 the AR system 401 captures the document holder, as shown in FIG. 4. Here, as shown in FIG. 6, for example the biometric features of the document holder are firstly captured in a step 606. This can be, for example, a photograph of the document holder's face. The biometric features of the document holder can be compared, for example, with the biometric data of the storage medium of the security document, the photograph on the security document in a step 608 or the database in a step 609.

In respect of the comparison with the biometric data of the storage medium of the security document, the photograph on the security document or the database, reference is made to the above statements.

Possible discrepancies can be superimposed on the security document or the document holder by means of optical overlays. Thus, for example, deviating anatomical-physiological features can be superimposed on the document holder.

If the captured biometric features of the document holder match the biometric data of the storage medium of the security document, the photograph on the security document or the database, a corresponding hint can be output to the user.

Furthermore, items of information which comprise one or more parameters which specify a pathognomy, physiognomy and/or physiology of the document holder can be captured in a step 607. Pathognomy here relates to the state of mind, physiognomy relates to the facial features and physiology relates to the emotions of the document holder, which can be determined, for example, by adapting the software and/or hardware of the AR system. In addition to the already mentioned fields of pathognomy, physiognomy and/or physiology, further criteria can, of course, be used. The one or more parameters can, for example, allocate a state of mind to the document holder by comparison with tables of values. Such items of information make it possible to determine the state of mind of the document holder and to output distinctive features or hints to the user.

Optionally, in a step 404 the AR system 401 can output messages and notifications, such as for example messages from authorities or other document checkpoints, notifications from colleagues or control centers. An efficient and rapid check can hereby be guaranteed and, for example, the safety of the user during the inspection process can be increased.

Furthermore, the AR system 401, as shown in FIG. 4, can carry out a system recording in a step 405. By system recording is meant here the storage of the captured items of information, the results of the checks carried out and/or the user.

Figure 7:
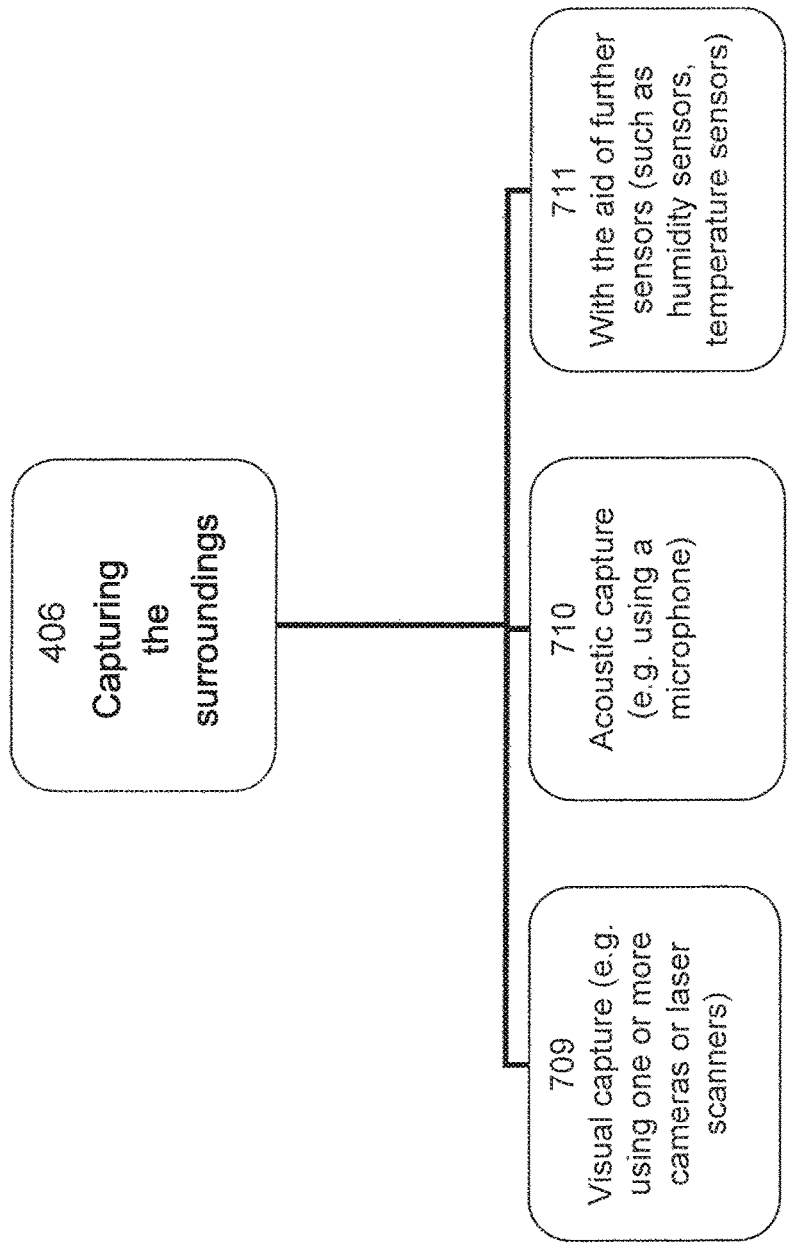

Optionally, the AR system 401, as shown in FIG. 4, can capture further items of information of the spatial context in a step 406, in particular in the case of a transportable/mobile use of the AR system 401. Here, as shown in FIG. 7, further items of information are firstly captured. Thus, for example, in a step 709 further items of information can be captured visually, for example by means of one or more cameras or by means of a laser scanner. For example, a further visually captured item of information can be the document holder's license plate number. It is also possible, in a step 710, to capture further items of information acoustically, for example by means of a microphone. Such an item of information can relate, for example, to the document holder's voice. Thus, for example, the captured voice can be compared with the database by means of a frequency analysis, in particular it can enable a conclusion in respect of the (native) language and/or the dialect, and/or established changes in the voice supply a hint of possible lies or false statements. It is also possible, in a step 711, to capture further items of information about the environment using further sensors such as for example humidity sensors, an infrared camera or temperature sensors. For example, inferences of disease symptoms can be achieved through the capture and analysis of the body temperature and/or signs of nervousness as a result of a false statement, for example, can be established by means of analysis of the blood circulation in the face. Including the further items of information in respect of the spatial context can further improve the check of the security document.

Optionally, the AR system 401 can, as in FIG. 4, further carry out a position determination in a step 407. In respect of the position determination, reference is made here to the above statements. The items of information in respect of the position determination of the AR system can furthermore be consulted, in particular, for location-dependent references, for further inspections of the security document or for cross references to locations of other inspections.

The invention claimed is:

1. A method for inspecting a security document comprising:
   capturing one or more first items of information from the security document with a capturing device provided on a pair of smart glasses of an augmented reality (AR) system, wherein the one or more first items of information is a photograph provided on the security document;
   checking the captured one or more first items of information by comparison with a database;
   storing one or more results of the check of the one or more first items of information;
   outputting the one or more results of the check of the one or more first items of information by means of the AR system;
   capturing an optical appearance of an optically variable security feature provided on the security document, the optically variable security feature being generated in an optically capturable manner by diffractive structures, zero-order diffraction structures, blazed gratings, macrostructures, lens structures, microprism structures, mirror surfaces, mat structures, anisotropic or isotropic mat structures or combinations of these structures;
   verifying the captured appearance of the optically variable security feature by comparison with a database;
   capturing a photograph of a holder of the security document with the capturing device provided on the pair of smart glasses of the augmented reality (AR); and
   checking the captured photograph of the holder of the security document by comparison with a database, wherein the one or more first items of information are compared with the captured photograph of the holder of the security document.

2. A method according to claim 1, wherein one or more symbols, logos, images, signs, alphanumeric characters or numbers are captured as one or more additional items of information.

3. A method according to claim 1, wherein one or more second items of information are captured from the captured photograph of the document holder, wherein the one or more second items of information are items of biometric information of the head, and are determined by a facial recognition algorithm.

4. A method according to claim 3, wherein the biometric information comprises one or more parameters which specify a pathognomy, physiognomy and/or physiology of the document holder.

5. A method according to claim 1, wherein one or more of the captured first items of information are output by means of the AR system in visual form before the check is carried out.

6. A method according to claim 1, wherein the AR system superimposes one or more of the results of the check on the security document optically by means of an optical overlay.

7. A method according to claim 6, wherein the one or more of the results of the check superimposed on the security document by means of the optical overlay comprise items of information regarding discrepancies/conflicts on the security document, security features containing discrepancies, items of content information or anatomical-physiological features.

8. A method according to claim 1, wherein one or more of the results of the check of the one or more first items of information of the security document are output in visual, acoustic and/or tactile form by means of the AR system.

9. A method according to claim 1, wherein, during the check of one or more of the first items of information, it is checked firstly whether one or more objects are present.

10. A method according to claim 9, wherein, during the check of one or more of the first items of information, one or more features of at least one object of the one or more objects are determined by means of an image-processing algorithm.

11. A method according to claim 10, wherein at least one feature of the one or more features is constituted by the contours of the at least one object of the one or more objects and the image-processing algorithm is an edge detection algorithm.

12. A method according to claim 1, further comprising checking items of information about chronological references to already inspected security documents, hints relating to general circumstances/events, items of information regarding on-site incidents or with locational/personal reference, cross references to further inspections/screenings of the security document, hints relating to the relationship field of the document holder, hints relating to further security features of the security document, hints to manually check the security features and statistics.

13. A method according to claim 1, wherein the one or more results comprise results about personal data, including the name, the date of birth or the sex of the document holder, place of issue of the security document and validity of the security document.

14. A method according to claim 1, wherein the document type is determined as at least one result during the step of checking the one or more first items of information by comparison with a database.

15. A method according to claim 1, wherein the one or more first items of information and/or second items of information are optically captured by means of one or more cameras.

16. A method according to claim 1, wherein, before the capture of one or more first items of information of the security document by means of the AR system, the illuminance is measured and a light source of the AR system is activated at an illuminance of less than 800 lx.

17. A method according to claim 1, wherein the comparison with the database takes place via a wireless communication connection.

18. An augmented reality (AR) system for carrying out the method according to claim 1, which has the following components:
   one or more capture devices for capturing the one or more first items of information of the security document;
   a control device, wherein the control device is designed such that it checks the one or more first items of information by comparison with a database and stores and/or outputs one or more of the results of the check of the one or more first items of information.

19. An AR system according to claim 18, wherein the AR system has an infoscreen of a pair of smart glasses, a head-up display or a screen.

20. An AR system according to claim 18, wherein at least one of the capture devices detects electromagnetic waves in the wavelength range of from 200 nm to 50 μm.

21. An AR system according to claim 18, wherein at least one of the capture devices is a camera.

22. An AR system according to claim 18, wherein the AR system has one or more capture devices for capturing one or more second, third and/or fourth items of information.

23. An AR system according to claim 18, wherein the control device has a communication interface for wirelessly accessing the database.

24. An AR system according to claim 18, wherein the database and/or parts of the database are stored in a storage medium of the control device.

25. An AR system according to claim 18, wherein the AR system is a pair of smart glasses.

26. The method according to claim 1, further comprising displaying instructions as to the relative position or distance the security document is to be held or moved with respect to the capture device of the smart glasses on a display of the smart glasses.

27. The method according to claim 1, wherein additional items of information are machine-read from the security document optically, electromagnetically, magnetically, electrically and/or electronically, wherein the machine-read items of information are not visually recognizable to the human observer.

28. A method according to claim 27, wherein the reading step comprises reading from one or more storage media of the security document.

29. A method according to claim 28, wherein the one or more storage media contain biometric data.

30. A method according to claim 28, wherein the one or more storage media are read by means of electromagnetic waves with an RFID reader.

31. The method according to claim 1, further comprising capturing one or more third items of information of a spatial context.

32. A method according to claim 31, wherein one or more of the third items of information are items of visual, acoustic, thermal or chemical information of the spatial context.

33. A method according to claim 31, wherein one or more of the third items of information are captured by means of one or more microphones, humidity sensors, photodetectors or temperature sensors.

34. A method according to claim 31, further comprising:
    capturing one or more fourth items of information, comprising position and/or location determination of the AR system in the area.

35. A method according to claim 34, wherein the one or more fourth items of information are determined by a global position-determining system, and/or by at least one acceleration sensor.

* * * * *